US012701498B2

(12) United States Patent
Panzner et al.

(10) Patent No.: US 12,701,498 B2
(45) Date of Patent: Aug. 4, 2026

(54) RECEIVING SEGMENTS OF SYSTEM INFORMATION BLOCK MESSAGE

(71) Applicant: NOKIA TECHNOLOGIES OY, Espoo (FI)

(72) Inventors: Berthold Panzner, Holzkirchen (DE); Nuno Manuel Kiilerich Pratas, Gistrup (DK); Lianghai Ji, Aalborg (DK); Faranaz Sabouri-Sichani, Aalborg (DK); Ranganathan Mavureddi Dhanasekaran, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 359 days.

(21) Appl. No.: 18/271,567

(22) PCT Filed: Jan. 20, 2022

(86) PCT No.: PCT/EP2022/051232
§ 371 (c)(1),
(2) Date: Jul. 10, 2023

(87) PCT Pub. No.: WO2022/161848
PCT Pub. Date: Aug. 4, 2022

(65) Prior Publication Data
US 2024/0073789 A1      Feb. 29, 2024

(30) Foreign Application Priority Data

Jan. 27, 2021      (FI) ...................................... 20215090

(51) Int. Cl.
*H04W 48/14* (2009.01)

(52) U.S. Cl.
CPC ................................... *H04W 48/14* (2013.01)

(58) Field of Classification Search
CPC ... H04W 48/14; H04W 28/065; H04W 48/12; H04W 48/16; H04W 24/02; H04W 76/19;
(Continued)

(56) References Cited

U.S. PATENT DOCUMENTS

| | | | |
|---|---|---|---|
| 6,628,946 B1 * | 9/2003 | Wiberg | ................. H04W 48/12 455/434 |
| 2008/0137637 A1 * | 6/2008 | Cho | ...................... H04W 48/12 370/349 |

(Continued)

OTHER PUBLICATIONS

International Search Report & Written Opinion dated May 25, 2022 corresponding to International Patent Application No. PCT/EP2022/051232.

(Continued)

*Primary Examiner* — Yuwen Pan
*Assistant Examiner* — Samuel H. Leonard
(74) *Attorney, Agent, or Firm* — Barta Jones, PLLC

(57) ABSTRACT

There is provided receiving, by a wireless device connected to a wireless network over a wireless connection, one or more segments of at least one system information block message; determining, by the wireless device, at least one hash value based on at least one segment of the received one or more segments; transmitting, by the wireless device to the wireless network, a system information request comprising information identifying the at least one segment and the determined at least one hash value.

9 Claims, 9 Drawing Sheets 602 determining, by a wireless network, one or more hash values based on one or more segments of at least one system information block message 604 receiving, by the wireless network from a wireless device, a system information request comprising information identifying at least one system information block message segment received by the wireless device and at least one hash value determined based on the at least one system information block message segment 606 determining, by the wireless network, at least one non-received segment of the at least one system information block message based on the received system information request and the one or more hash values determined by the wireless network 608 transmitting, by the wireless network to the wireless device, the determined at least one non-received segment of the system information block message

(58) Field of Classification Search
  CPC ..... H04L 1/1809; H04L 9/3236; H04L 47/34;
  H04L 63/123
  See application file for complete search history.

(56) References Cited

U.S. PATENT DOCUMENTS

| | | | | |
|---|---|---|---|---|
| 2008/0172392 | A1* | 7/2008 | Crichton | G06F 9/5072 |
| 2008/0182577 | A1* | 7/2008 | Ng | H04W 72/535 |
| | | | | 455/435.2 |
| 2010/0183031 | A1* | 7/2010 | Dalsgaard | H04W 28/06 |
| | | | | 370/474 |
| 2017/0374608 | A1* | 12/2017 | Li | H04W 48/16 |
| 2019/0215858 | A1* | 7/2019 | Ishii | H04W 48/14 |
| 2019/0394211 | A1* | 12/2019 | Filsfils | H04L 63/12 |
| 2021/0105852 | A1* | 4/2021 | Shih | H04W 76/10 |
| 2021/0377844 | A1* | 12/2021 | Tseng | H04W 72/0453 |
| 2022/0014980 | A1* | 1/2022 | Tseng | H04W 76/30 |
| 2022/0330109 | A1* | 10/2022 | Ohlsson | H04W 76/27 |
| 2022/0377649 | A1* | 11/2022 | Choi | H04W 48/12 |

OTHER PUBLICATIONS

Oppo (Rapporteur), "[AT109bis-e][704][V2X] SIB 12/28 (Oppo)," 3GPP Draft; R2-2004075, 3GPP TSG-RAN WG2 #109bis-e, Electronic Meeting, Apr. 20-30, 2020, May 1, 2020, XP051879346.

3GPP TS 38.331 V16.3.1 (Jan. 2021), Technical Specification, 3rd Generation Partnership Project; Technical Specification Group Radio Access Network; NR; Radio Resource Control (RRC) protocol specification (Release 16), Jan. 7, 2021, pp. 1-932, XP051999705.

Nokia et al., "SIB Handling in Sidelink UE-to-Nwk Relay," 3GPP Draft; R2-2103482, 3GPP TSG-RAN WG2 Meeting #113bis, Electronic, Elbonia, Apr. 12-20, 2021, Apr. 1, 2021, XP051992102.

* cited by examiner 502 receiving, by a wireless device from a wireless network, one or more segments of at least one system information block message 504 determining, by the wireless device, at least one hash value based on at least one segment of the received one or more segments 506 transmitting, by the wireless device to the wireless network, a system information request comprising information identifying the at least one segment and the determined at least one hash value

Fig. 5

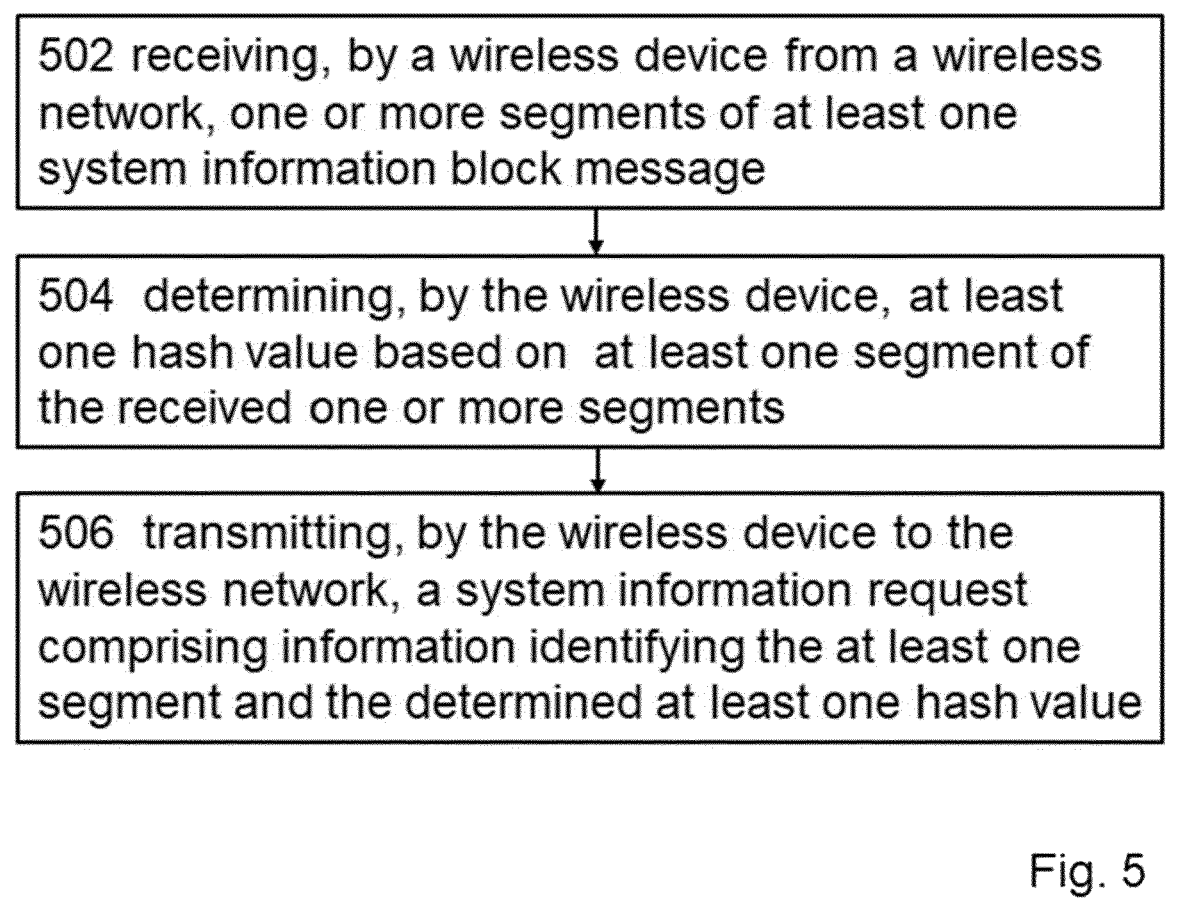

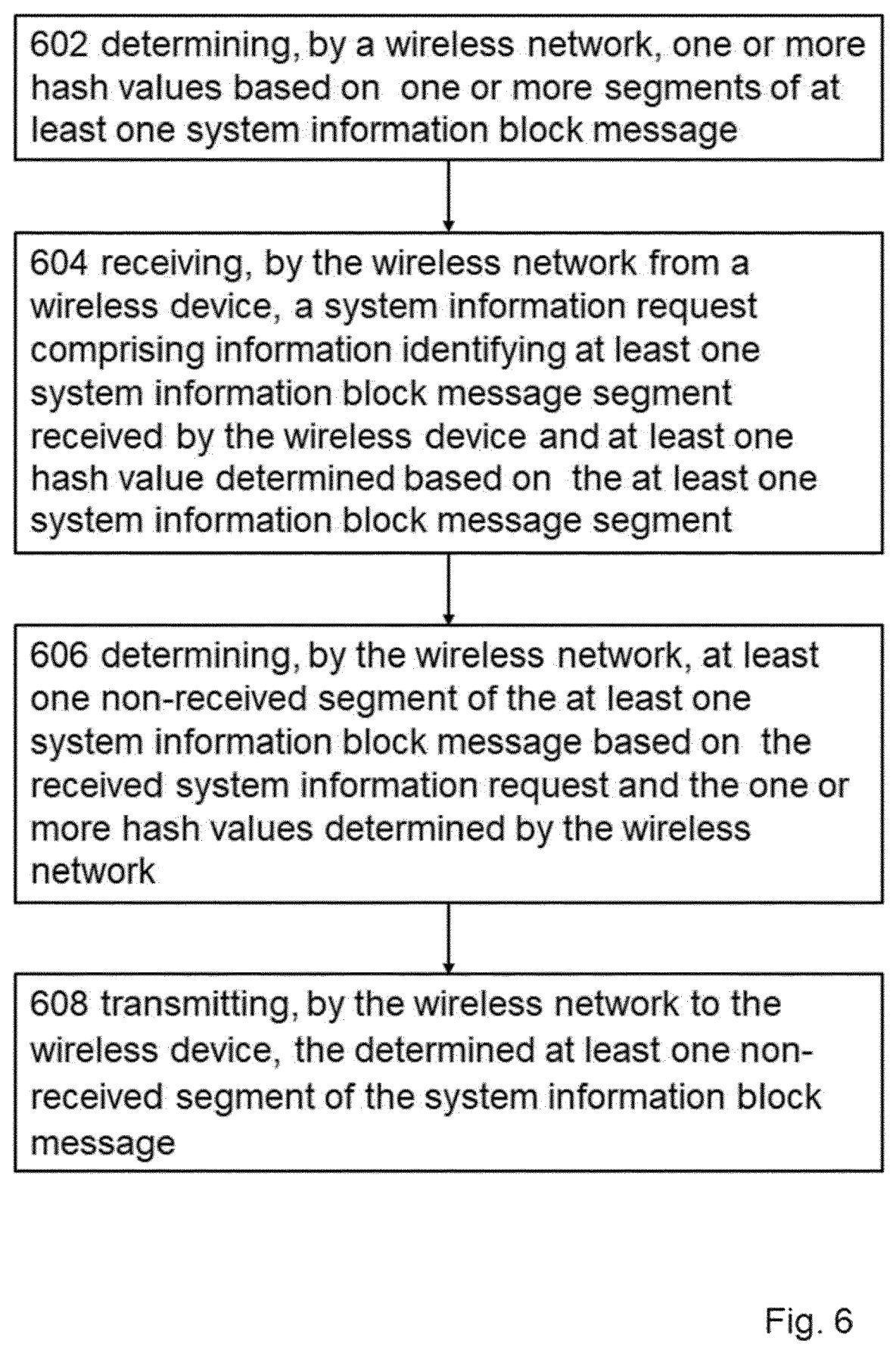

602 determining, by a wireless network, one or more hash values based on one or more segments of at least one system information block message 604 receiving, by the wireless network from a wireless device, a system information request comprising information identifying at least one system information block message segment received by the wireless device and at least one hash value determined based on the at least one system information block message segment 606 determining, by the wireless network, at least one non-received segment of the at least one system information block message based on the received system information request and the one or more hash values determined by the wireless network 608 transmitting, by the wireless network to the wireless device, the determined at least one non-received segment of the system information block message

Fig. 6

702  cell reselection
(segmentType-rxx == notLastSegment)

704  on-demand SIB request
(segmentNumber-rxx, SIBTag-rxx)

706  new cell checks with same hash function:
if (calculatedSIBHash==receivedSIBHash)
        transmit segmentNumber=segmentNumber++
else
        transmit segmentNumber=0

RECEIVING SEGMENTS OF SYSTEM INFORMATION BLOCK MESSAGE

TECHNICAL FIELD

The present invention relates to communicating system information.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In a wireless network, system information is carried from a base station to a user equipment (UE) in System Information (SI) messages. System Information Blocks (SIBs) can be segmented into multiple SI messages. Section 6.3.1 of TS 3GPP 38.331 V16.3.1 (2021 January) Radio Resource Control (RRC) protocol specification (Release 16) describes examples of SIB types. System Information Block type 12 (SIB12) comprises configurations for NR Sidelink communications.

In vehicle-to-everything (V2X), vehicles may be equipped with user equipment configured to wirelessly communicate with other user equipment, such as vehicle-to-vehicle (V2V) user equipment, vehicle-to-network nodes (V2N), vehicle-to-pedestrian (V2P), and/or any other type of device. The V2X messages may be used to exchange messages, such as traffic related messages, alerts, autonomous or semi-autonomous driving messages, and/or any other type of data or message. For example, a V2X message may be sent from a first vehicle via a sidelink to other nearby vehicles warning the other vehicles of a hazardous traffic condition.

When UE interested in sidelink communication is receiving segments of SIB12 broadcast via a current cell and the UE is moved to a new cell, it discards all previously received SIB12 segments and requests a SIB12 broadcast from the new cell. However, nearby cells may have similar configurations for sidelink communications, whereby discarding the SIB12 segments in connection with cell reselection causes unnecessary transmission of the SIB12 broadcast from the new cell. Unnecessary transmission of the SIB12 can occur also, when the UE misses at least one SIB12 segment during the reception of the SIB12 broadcast, whereby the UE has not received the complete SIB12 message.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect there is provided a method comprising:

receiving, by a wireless device from a wireless network, one or more segments of at least one system information block message;

determining, by the wireless device, at least one hash value based on at least one segment of the received one or more segments;

transmitting, by the wireless device to the wireless network, a system information request comprising information identifying the at least one segment and the determined at least one hash value.

According to a second aspect there is provided a method comprising:

determining, by a wireless network, one or more hash values based on one or more segments of at least one system information block message;

receiving, by the wireless network from a wireless device, a system information request comprising information identifying at least one system information block message segment received by the wireless device and at least one hash value determined based on the at least one system information block message segment;

determining, by the wireless network, at least one non-received segment of the at least one system information block message based on the received system information request and the one or more hash values determined by the wireless network; and transmitting, by the wireless network to the wireless device, the determined at least one non-received segment of the system information block message.

According to a third aspect there is provided an apparatus comprising:

means for receiving, by a wireless device from a wireless network, one or more segments of at least one system information block message;

means for determining, by the wireless device, at least one hash value based on at least one segment of the received one or more segments;

means for transmitting, by the wireless device to the wireless network, a system information request comprising information identifying the at least one segment and the determined at least one hash value.

According to a fourth aspect there is provided an apparatus comprising:

means for determining, by a wireless network, one or more hash values based on one or more segments of at least one system information block message;

means for receiving, by the wireless network from a wireless device, a system information request comprising information identifying at least one system information block message segment received by the wireless device and at least one hash value determined based on the at least one system information block message segment;

means for determining, by the wireless network, at least one non-received segment of the at least one system information block message based on the received system information request and the one or more hash values determined by the wireless network;

means for transmitting, by the wireless network to the wireless device, the determined at least one non-received segment of the system information block message.

According to a fifth aspect there is provided an apparatus comprising:

one or more processors, and memory storing instructions that, when executed by the one or more processors, the apparatus is caused to:

receive, by a wireless device connected to a wireless network, one or more segments of at least one system information block message;

determine, by the wireless device, at least one hash value based on at least one segment of the received one or more segments;

transmit, by the wireless device to the wireless network, a system information request comprising information identifying the at least one segment and the determined at least one hash value.

According to a sixth aspect there is provided an apparatus comprising:

one or more processors, and memory storing instructions that, when executed by the one or more processors, the apparatus is caused to:

determine, by a wireless network, one or more hash values based on one or more segments of at least one system information block message;

receive, by the wireless network from a wireless device, a system information request comprising information identifying at least one system information block message segment received by the wireless device and at least one hash value determined based on the at least one system information block message segment;

determine, by the wireless network, at least one non-received segment of the at least one system information block message based on the received system information request and the one or more hash values determined by the wireless network;

transmit, by the wireless network to the wireless device, the determined at least one non-received segment of the system information block message.

According to a seventh aspect there is provided computer program comprising computer readable program code means adapted to perform at least the following:

receiving, by a wireless device from a wireless network, one or more segments of at least one system information block message;

determining, by the wireless device, at least one hash value based on at least one segment of the received one or more segments;

transmitting, by the wireless device to the wireless network, a system information request comprising information identifying the at least one segment and the determined at least one hash value.

According to an eighth aspect there is provided computer program comprising computer readable program code means adapted to perform at least the following:

determining, by a wireless network, one or more hash values based on one or more segments of at least one system information block message;

receiving, by the wireless network from a wireless device, a system information request comprising information identifying at least one system information block message segment received by the wireless device and at least one hash value determined based on the at least one system information block message segment;

determining, by the wireless network, at least one non-received segment of the at least one system information block message based on the received system information request and the one or more hash values determined by the wireless network; and transmitting, by the wireless network to the wireless device, the determined at least one non-received segment of the system information block message.

According to a ninth aspect there is provided non-transitory computer readable medium comprising program instructions for causing an apparatus to perform at least the following:

receiving, by a wireless device from a wireless network, one or more segments of at least one system information block message;

determining, by the wireless device, at least one hash value based on at least one segment of the received one or more segments;

transmitting, by the wireless device to the wireless network, a system information request comprising information identifying the at least one segment and the determined at least one hash value.

According to a tenth aspect there is provided non-transitory computer readable medium comprising program instructions for causing an apparatus to perform at least the following:

determining, by a wireless network, one or more hash values based on one or more segments of at least one system information block message;

receiving, by the wireless network from a wireless device, a system information request comprising information identifying at least one system information block message segment received by the wireless device and at least one hash value determined based on the at least one system information block message segment;

determining, by the wireless network, at least one non-received segment of the at least one system information block message based on the received system information request and the one or more hash values determined by the wireless network; and transmitting, by the wireless network to the wireless device, the determined at least one non-received segment of the system information block message.

One or more of the above aspects may comprise at least some of the following features of the following list:

the system information request is transmitted in connection with a change of a wireless connection between the wireless device and the wireless network or the wireless device determining at least one missing segment of the at least one system information block message;

receiving, by the wireless device, in response to the transmitted system information request, one or more further segments of the at least one system information block message; and assembling, by the wireless device, the at least one system information block message based on the received one or more segments of the system information block message, and the received one or more further segments of the at least one system information block message;

determining, by the wireless device, a digest of hash values of received segments of the at least one system information block message; and transmitting, by the wireless device, the digest of hash values of the received segments included to the system information request;

determining, by the wireless device, a last received segment of the at least one system information block message; and transmitting, by the wireless device, a hash value of the determined last received segment included to the system information request;

the system information request comprises information indicating a system information block type;

the system information block message comprises a side-link configuration;

each of the received one or more segments are hashed using the system information block tag and a segment number of the segment;

the at least one system information block message comprises a system information block tag;

determining, by the wireless network, the one or more hash values using the system information block tag and a segment number of the at least one system information block message segment;

determining the system information block tag independently for a cell of the wireless network; or determining the system information block tag based on an exchange of system information block tag information between cells of the wireless network;

the received at least one hash value is determined based on the at least one system information block message segment comprises a hash value of a last system information block message segment received by the wireless device;

the system information request comprises a digest of hash values of system information block message segments received by the wireless device;

the change of the wireless connection is a cell reselection or a cell selection to the same cell, for example after disconnection of the wireless connection.

At least some embodiments provide saving communications resources used for system information.

BRIEF DESCRIPTION OF THE DRAWINGS

For a more complete understanding of example embodiments of the present invention, reference is now made to the following descriptions taken in connection with the accompanying drawings in which:

FIGS. 5, 6 and 7 illustrate examples of methods in accordance with at least some embodiments of the present invention.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Wireless device that is connected to a wireless network may receive one or more segments of at least one system information block message. The wireless device may determine at least one hash value based on at least one segment of the received one or more segments and transmit to the wireless network, a system information request comprising information identifying the at least one segment and the determined at least one hash value. The wireless network is in this way informed of the received segments at the wireless device and may avoid transmitting the already received segments to the wireless device. This saves valuable broadcast radio resources and enables significant reduction of air interface resources between the wireless device and the wireless network. If the wireless network would not be provided the information of the received segments, a possible scenario would be that all but one segment of the system information block message would have been received at the wireless device, the wireless network would re-transmit the already received segments again and the wireless device could decide to discard the received segments.

In an example scenario, where the system information block message is a SIB12 message, Section 5.2.2.4.13 Actions upon reception of SIB12 of TS 38.331 V16.3.1 (2021 January) Radio Resource Control (RRC) protocol specification (Release 16), formulates: "The UE should discard any stored segments for SIB12 if the complete SIB12 has not been assembled within a period of 3 hours. The UE shall discard any stored segments for SIB12 upon cell (re-) selection." This is challenging for sidelink communications since the SIB12 contains sidelink configuration for wireless devices. However, with the help of the examples described herein air interface resources, and particularly the broadcast radio resources on a Downlink Shared Channel, may be saved.

Figure 1:
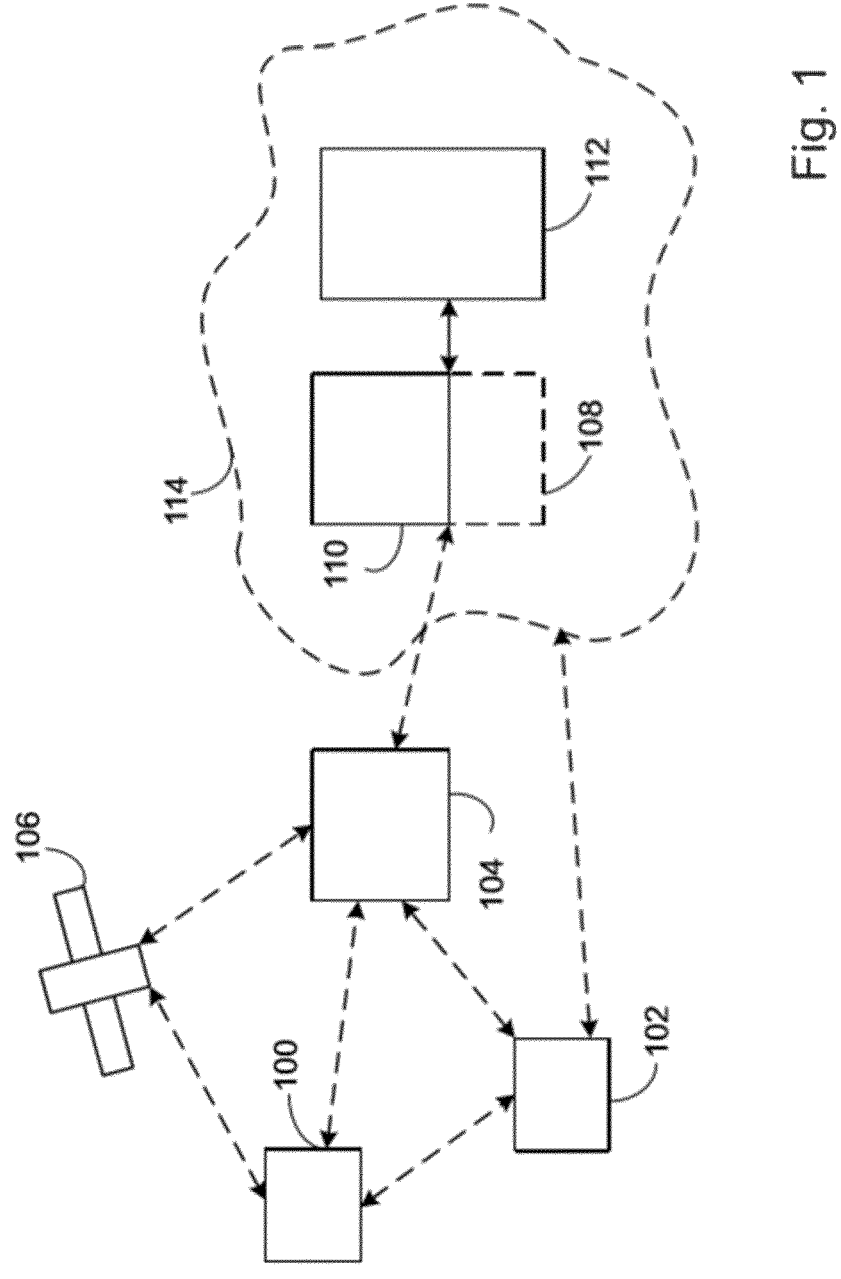
FIG. 1 shows a part of an exemplifying wireless communications access network in accordance with at least some embodiments of the present invention.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node provides access by way of communications of radio frequency (RF) signals and may be referred to a radio access node. It should be appreciated that the radio access network may comprise more than one access nodes, whereby a handover of a wireless connection of the user device from one cell of one access node, e.g. a source cell of a source access node, to another cell of another node, e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
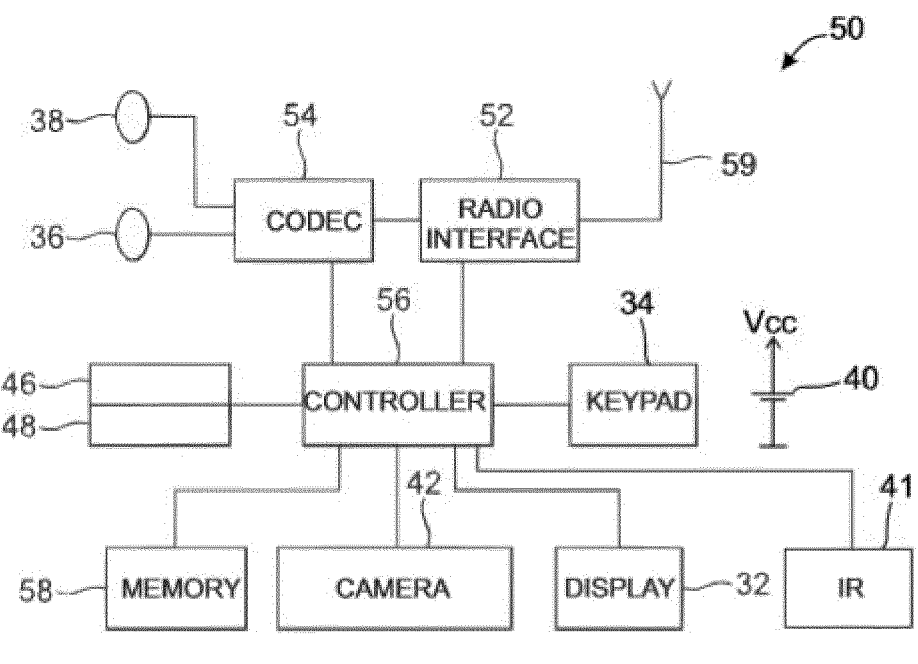
FIG. 2 shows a block diagram of an apparatus in accordance with at least some embodiments of the present invention.
Figure 3:
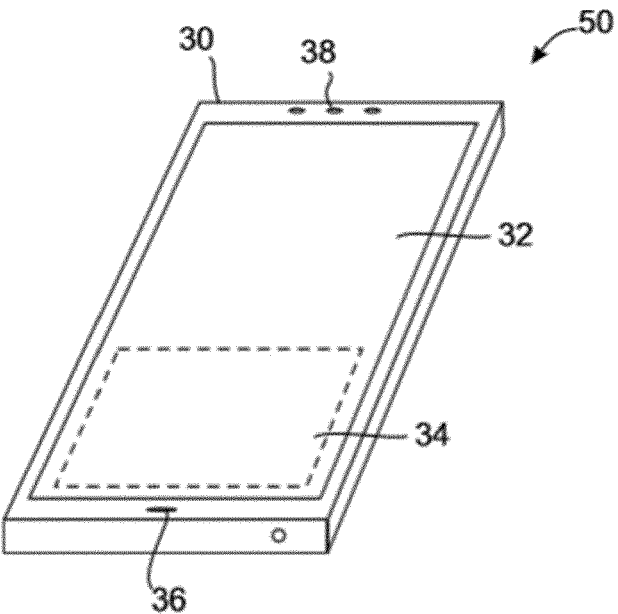
FIG. 3 shows an apparatus in accordance with at least some embodiments of the present invention.

The following describes in further detail suitable apparatus and possible mechanisms for implementing some embodiments. In this regard reference is first made to FIG. 2 which shows a schematic block diagram of an exemplary apparatus or electronic device 50 depicted in FIG. 3, which may incorporate a transmitter according to an embodiment of the invention.

The electronic device 50 may for example be a communications device, wireless device, mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network or a sidelink. The apparatus 50 may further comprise an antenna 59 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 4:
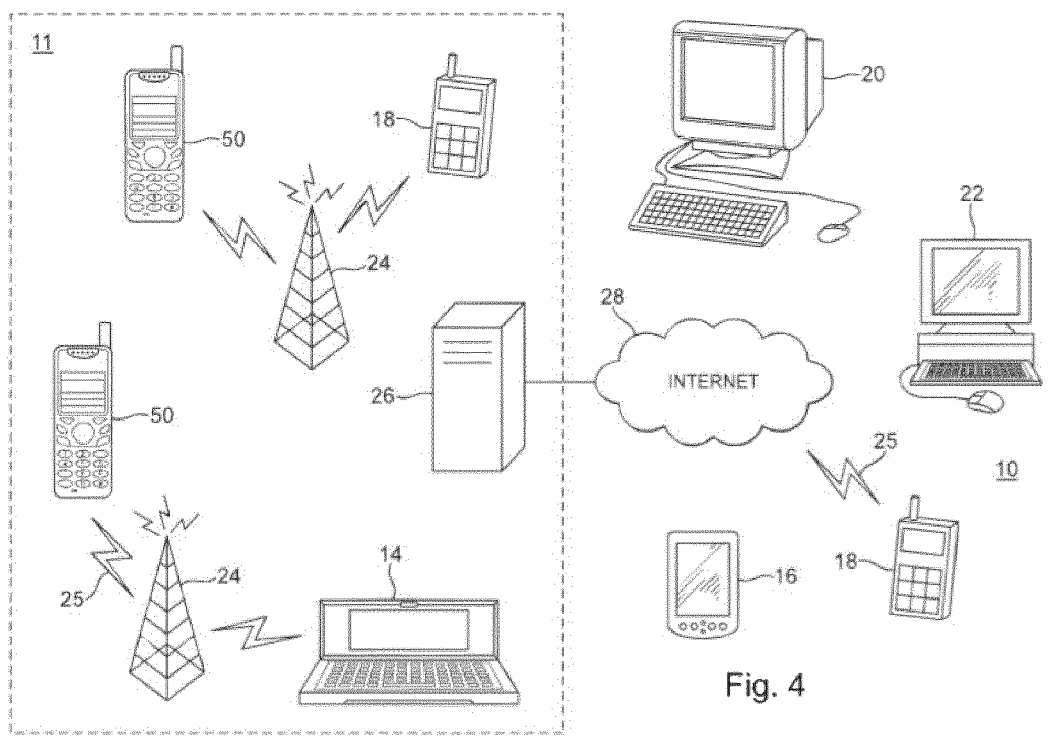
FIG. 4 shows an example of an arrangement for wireless communications comprising a plurality of apparatuses, networks and network elements in accordance with at least some embodiments of the present invention.

With respect to FIG. 4, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 4 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE), 5G and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

In an example in accordance with at least some embodiments the communications of the communications devices may comprise uplink transmissions, downlink transmissions and/or sidelink transmissions. The uplink transmissions may be performed from a wireless device to the wireless communication system, e.g. an access node, and the downlink transmissions may be performed from the wireless communication system, e.g. an access node, to the wireless device. The uplink transmissions may be performed on an uplink shared channel, e.g. a Physical Uplink Shared Channel (PUSCH). The PUSCH may be transmitted by the wireless device based on a grant received on a downlink control channel, e.g. a Physical Downlink control Channel (PDCCH). The downlink transmissions may be performed on a downlink shared channel, e.g. a Physical Downlink Shared Channel (PDSCH). Release 15 specifications of the 3GPP may be referred to for examples PUSCH and PDSCH procedures. Sidelink may refer to the interface between UEs, or wireless devices, for Device-to-Device (D2D) communication and D2D discovery. The sidelink enables a direct communication between proximal wireless devices. PC5 is an example of a radio interface for sidelink and specified in 3 GPP LTE, Release 12 and beyond. Section 5.8. of the TS 38.331 describes Sidelink procedures. Thus, in sidelink transmissions data does not need to go through the access network e.g. through an infrastructure node of the access network such as an eNB or a gNB. Sidelink transmissions enable services that are often called "Proximity Services" (or ProSe) and the UEs supporting sidelink "ProSe'-enabled UEs. The channel defined/used by the sidelink may be a Physical Sidelink Control Channel: PSCCH. A control channel that is used to broadcast basic system information for D2D communication is the Physical Sidelink Broadcast Channel (PSBCH). Also, the channel used for transmitting the D2D discovery signal may be defined as a Physical Sidelink Discovery Channel (PSDCH). The D2D synchronization signal may be referred to as a SideLink Synchronization Signal (SLSS) or a D2D Synchronization Signal (D2DSS).

Figure 7:
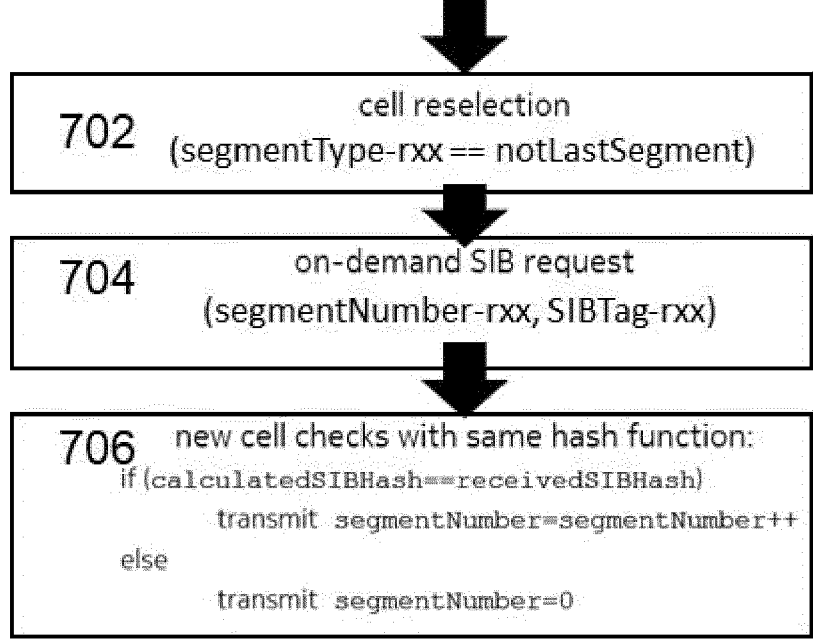

FIGS. 5, 6 and 7 illustrate examples of methods in accordance with at least some embodiments of the present invention. Referring to FIG. 5, the method enables informing a wireless network about received segments of at least one system information block message.

Phase 502 comprises receiving, by a wireless device from a wireless network, one or more segments of at least one system information block message.

Phase 504 comprises determining, by the wireless device, at least one hash value based on at least one segment of the received one or more segments.

In an example, in phase 504, the hash value is calculated based on the last successfully received segment of the system information block message. The last received segment may be the last received segment before a missing/non-received segment of the system information block message. In other words, the last received segment may be the last segment in a sequence of successfully received segments, without any missing segments. The missing/non-received segments may be caused for example by a change of a wireless connection between the wireless device and the wireless network or radio link condition deterioration (RLCD).

Phase 506 comprises transmitting, by the wireless device to the wireless network, a system information request comprising information identifying the at least one segment and the determined at least one hash value. In this way the wireless device may indicate to the wireless network the last received segment and the wireless network may transmit the wireless device any missing segments of the system information block message. In an example, the information identifying the at least one segment comprises a segment number of the segment.

In an example in accordance with at least some embodiments phase 506 comprises transmitting, by the wireless device, the system information request in connection with a change of a wireless connection between the wireless device and the wireless network, or determining, by the wireless device, at least one missing segment of the at least one system information block message. In an example, a wireless connection of the wireless device may be changed to another wireless connection and the system information request is transmitted by the wireless device over the another wireless connection. In an example, the change of the wireless connection may be a cell reselection or a cell selection to the same cell, for example after disconnection of the wireless connection. The cell reselection may be from a current serving cell of the wireless device to a new serving cell of the wireless device. The current serving cell and the new serving cell may be hosted by the same access node, eNB or gNB. Radio link condition deterioration (RLCD) may cause the disconnection and the wireless device performing a cell selection, whereby the wireless device may connect with the same serving cell or a different serving cell than the serving cell of the wireless device before disconnection of the wireless connection.

In an example, phase 506 comprises that the system information request is a Radio Resource Control (RRC) Protocol message. The RRC protocol is described in TS 38.331 V16.3.1 (2021 January) Radio Resource Control (RRC) protocol specification (Release 16). The system information request in may be a DedicatedSIBRequest described in Section 6.2.2 on page 245 of the TS 38.331 modified to include information identifying the at least one segment, for example a segment number of the segment, and the determined at least one hash value for the segment.

In an example in accordance with at least some embodiments, phase 506 comprises receiving, by the wireless device, in response to the transmitted system information request, one or more further segments of the at least one system information block message; and assembling, by the wireless device, the at least one system information block message based on a. the received one or more segments of the system information block message, and b. the received one or more further segments of the at least one system information block message.

In this way assembling a system information block message is supported for example in connection with a change of a wireless connection of a wireless device to a wireless network, whereby unnecessary transmissions of system information block segments may be avoided. The change of the wireless connection may be a cell reselection or a cell selection to the same cell, for example after disconnection of the wireless connection.

In an example in accordance with at least some embodiments, phase 504 comprises determining, by the wireless device, a last received segment of the at least one system information block message; and phase 506 comprises transmitting, by the wireless device, a hash value of the determined last received segment included to the system information request. In this way the wireless network may be efficiently provided information that enables the wireless network to determine which segments of the system information block message have been successfully received by the wireless device, whereby the wireless network may avoid transmitting segments unnecessarily to the wireless device.

In an example in accordance with at least some embodiments, phase 504 comprises determining, by the wireless device, a digest of hash values of received segments of the at least one system information block message; and phase 506 comprises transmitting, by the wireless device, the digest of hash values of the received segments included to the system information request. An example of the digest is a set of hash values or a group of hash values of the system information block message segments received by the wireless device. The digest provides that the wireless network may be provided information of more than one received segment of the system information block message by the wireless device, whereby the wireless network may be provided more accurate information about received segments of the at least one system information block message for example in connection with a change of a wireless connection.

In an example in accordance with at least some embodiments, phase 506 comprises that the system information request comprises information indicating a system information block type. The system information block type may be SIB12.

In an example in accordance with at least some embodiments, phase 502 comprises that the system information block message comprises a sidelink configuration. The system information block message may be a SIB12 message.

In an example in accordance with at least some embodiments, phase 502 comprises that the at least one system information block message comprises a system information block tag. The system information block tag uniquely identifies the system information block message.

In an example in accordance with at least some embodiments, phase 504 comprises that each of the received one or more segments are hashed using the system information block tag and a segment number of the segment. Accordingly, the system information block tag may be used together with a segment number of a received segment as input to a hash function whereby the hash function may output different hash values for different segments.

Referring to FIG. 6, the method enables a wireless device to assemble a system information block message from segments received from a wireless network, whereby previously received segments of the system information block message do not need to be re-transmitted.

Phase 602 comprises determining, by a wireless network, one or more hash values based on one or more segments of at least one system information block message.

Phase 604 comprises receiving, by the wireless network from a wireless device, a system information request comprising information identifying at least one system information block message segment received by the wireless device and at least one hash value determined based on the at least one system information block message segment.

In an example the system information request may comprise information indicating a system information block type, information indicating a segment number of last received segment, information indicating a hash function used to hash the last received segment, information indicating a system information block tag and information indicating a hash value of the last segment. Table 1 below shows an example of the system information request that comprises the information indicating a system information block type, information indicating a segment number of last received segment, information indicating a hash function used to hash the last received segment, information indicating a system information block tag and information indicating a hash value of the last segment in the following information elements: sib-Type-rxx, lastSegmentNumber-rxx, sib-HashFct-rxx, sibTag-rxx, sibHash-rxx.

Phase 606 comprises determining, by the wireless network, at least one non-received segment of the at least one system information block message based on the received system information request and the one or more hash values determined by the wireless network.

Phase 608 comprises transmitting, by the wireless network to the wireless device, the determined at least one non-received segment of the system information block message.

In an example in accordance with at least some embodiments, phase 608 comprises the system information request is received in connection with a change of a wireless connection and the determined at least one non-received segment of the system information block message is transmitted over the changed wireless connection, or the system information request is received in connection with the wireless device determining at least one missing segment of the at least one system information block message and the determined at least one non-received segment of the system information block message is transmitted to the wireless device over the same wireless connection as a previous segment of the system information block message. In an example, the change of the wireless connection comprises a cell reselection or a cell selection. In connection with the cell reselection, one or more segments of the system information block message are first transmitted to the wireless device via one serving cell and after the cell reselection to another cell the at least one non-received segment of the system information block message is transmitted via the another cell. In connection with the cell selection, one or more segments of the system information block message are first transmitted to the wireless device via a serving cell and afterwards, for example caused by Radio link condition deterioration, a cell selection to the same serving cell, the at least one non-received segment of the system information block message is transmitted via the same serving cell.

In an example, phase 604 comprises that the system information request is a Radio Resource Control (RRC) Protocol message. The RRC protocol is described in TS 38.331 V16.3.1 (2021 January) Radio Resource Control (RRC) protocol specification (Release 16). The system information request in may be a DedicatedSIBRequest described in Section 6.2.2 on page 245 of the TS 38.331 modified to include information identifying the at least one segment, for example a segment number of the segment, and the determined at least one hash value for the segment.

In an example in accordance with at least some embodiments, phase 604 comprises that the at least one system information block message comprises a system information block tag. The system information block tag uniquely identifies the system information block message.

In an example in accordance with at least some embodiments, phase 602 comprises determining, by the wireless network, the one or more hash values using a system information block tag and a segment number of the at least one system information block message segment.

In an example in accordance with at least some embodiments, phase 602 comprises that the received at least one hash value is determined based on the at least one system information block message segment comprises a hash value of a last system information block message segment received by the wireless device. In this way the wireless network may efficiently receive information that enables the wireless network to determine which segments of the system information block message have been successfully received by the wireless device, whereby the wireless network may avoid transmitting segments unnecessarily to the wireless device if the segments have already been received.

In an example in accordance with at least some embodiments, phase 602 comprises that the system information request comprises a digest of hash values of system information block message segments received by the wireless device. An example of the digest is a set of hash values or a group of hash values of the system information block message segments received by the wireless device. The digest provides that the wireless network is provided information of more than one received segment of the system information block message by the wireless device, whereby the wireless network may be provided more accurate information about received segments of the at least one system information block message for example in connection with a change of a wireless connection between the wireless device and the wireless network. In an example, the system information request comprising a digest comprises information elements of SIB-ReqInfo-rxx described with Table 2 below.

In an example in accordance with at least some embodiments, phase 604 and phase 606 comprise: determining the system information block tag independently for a cell of the wireless network; or determining the system information block tag based on an exchange of system information block tag information between cells of the wireless network. In an example, determining the system information block tag (SIBTag) comprises providing the system information block tag by a higher layer. The higher layer may be a network function/network node at a network core, i.e. EPC/5GS. Examples of the network core functions/network nodes comprise a V2X control function or any other logical function in the network core such as Policy Control Function (PCF) or a V2X application function. In an example, the system information block tag may be based on a sequence of available information. Examples of the available information comprise a unique time-identifier e.g. every 1 hour; validity time, Public Land Mobile Network identifier, area code, etc. The unique time-identifier may identify a time value that is determined based on changes to content of system information block message content. In an example, an exchange of system information block tag information between cells of the wireless network comprises exchanging system information block tags between cells and/or gNBs hosting the cells. In an example the system information request comprises information indicating a system information block type, information indicating a segment number of last received segment, information indicating a hash function used to hash the last received segment, information indicating a system information block tag and information indicating a hash value of the last segment. Table 1 below shows an example of the system information request that comprises the information indicating a system information block type, information indicating a segment number of last received segment, information indicating a hash function used to hash the last received segment, information indicating a system information block tag and information indicating a hash value of the last segment in the following information elements: sib-Type-rxx, lastSegmentNumber-rxx, sib-HashFct-rxx, sibTag-rxx, sibHash-rxx.

Examples of methods in accordance with at least some embodiments are described with reference to FIG. 7, where a wireless device receives a SIB12 message that is an example of a system information block message described with phase 502 in FIG. 5. The wireless device transmits an on-demand SIB request in connection with a cell reselection as an example of transmitting a system information request in accordance to described with phase 506 of FIG. 5. In a cell reselection, the wireless device changes its serving cell, source cell, to another cell, target cell. The target cell and the source cell may be hosted by the same gNB or by different gNBs.

Phase 702 comprises the wireless device determining in connection with the cell reselection that a last segment of a SIB12 message has not been received. Therefore, a last segment received by the wireless device from the source cell is not the last segment of the SIB12 message and there the wireless device is missing one or more segments of the SIB12 message.

Phase 704 comprises the wireless device transmitting to the target cell an on-demand SIB request. In an example in accordance with at least some embodiments, the wireless device may include a segment number of the last segment of the SIB12 message, lastSegmentNumber-rxx, received from the source cell and a hash value, SIBHash-rxx, calculated based on the last segment of the SIB12 message received from the source cell, to the on-demand SIB request. An example of the on-demand SIB request comprising the lastSegmentNumber-rxx and SIBHash-rxx are described with Table 1. In an example in accordance with at least some embodiments, the wireless device may include a digest of hash values of received segments of the SIB12 message received from the source cell, to the on-demand SIB request. An example of contents of the on-demand SIB request comprising a digest is described with Table 2.

In an example in accordance with at least some embodiments phase 704 comprises that the on-demand SIB12 request comprises a last received segment of the SIB12 message. An example of the SIB12 request is a DedicatedSIBRequest specified in Section 6.2.2 on page 245 of TS 38.331 that is modified to comprise SIB-ReqInfo-rxx that comprises the lastSegmentNumber-rxx and SIBHash-rxx. An example of the SIB-ReqInfo-rxx using ASN1 representation is:

TABLE 1

SIB-ReqInfo-rxx field descriptions for DedicatedSIBRequest
SIB-ReqInfo field descriptions

| sib-Type-rxx |
| Contains the SIB type the UE requests while in |
| RRC_CONNECTED. |
| lastSegmentNumber-rxx |
| Contains the last successfully received SIB segment |
| sib-HashFct-rxx |
| Contains the hash function used to hash one SIB segment. |
| sibTag-rxx |
| Defines the unique SIB Tag valid for a SIB message. |
| sibHash-rxx |
| Contains the SIBHash at the UE of the last successfully received |
| segment |

Phase 706 comprises checking at the target cell, whether the SIBHash-rxx received from the wireless device included to the on-demand SIB12 request matches with any of the hash values calculated based on the segments of the SIB12 message using the same hash function as the wireless device for calculating SIBHash-rxx. If a match is found, the wireless network may determine that the segment used for calculating the hash value has been received by the wireless device and transmit one or more remaining segments to the wireless device. Accordingly, the next segment transmitted to the wireless device may have a higher segment number, e.g. the next segment in order, than the last segment received by the wireless device. Otherwise, i.e. if a match is not found, the wireless network may determine that the segment used for calculating the hash value is not valid and that at one or more segments of the SIB12 message are missing, or non-received, at the wireless device, and transmit the first segment of the SIB12 message to the wireless device. The first segment may have a segment number '0'. Therefore, when the match is not found, the wireless network knows that the segment used for calculating the hash value by the wireless device is not valid and therefore, the transmission of the SIB12 message should be started to the wireless device from the first segment.

In an example in accordance with at least some embodiments phase 704 comprises that the on-demand SIB12 request comprises a digest of hash values of received segments of the SIB12 message. In an example, the on-demand SIB12 request is a DedicatedSIBRequest specified in Section 6.2.2 on page 245 of TS 38.331 that is modified to comprise SIB-ReqInfo-rxx that comprises a digest of hash values of received segments of the SIB12 message. An example of the SIB-ReqInfo-rxx using ASN1 representation is:

```
SIB-ReqInfo-rxx ::=        SEQUENCE {
    sib-Type-rxx           ENUMERATED { sib12, sib13, sib14, spare5, spare4, spare3,
spare2, spare1 }
    lastSegmentNumber-rxx INTEGER (0..63),
    sibHash-rxx            OCTET STRING
    sib-HashFct-rxx        ENUMERATED { MD5, SHA1, SHA256, SHA512, spare4,
spare3, spare2, spare1 }
    sibTag-rxx             SIBTag-rxx                    OPTIONAL,
}
```

```
SIB-ReqInfo-rxx ::= SEQUENCE {
sib-Type-rxx   ENUMERATED { sib12, sib13, sib14, spare5, spare4, spare3, spare2, spare1
}
ReceivedSegmentsBitmap-rxx                          OCTET STRING (64),
ReceivedSegmentsHashList ::= SEQUENCE
sibSegmentNumber-rxx INTEGER (0..63), (Optional)
SibSegmentHash-rxx               OCTET STRING,
}
sib-HashFct-rxx   ENUMERATED { MD5, SHA1, SHA256, SHA512, spare4, spare3, spare2,
spare1 }
sibTag-rxx                        SIBTag-rxx          OPTIONAL,
}
```

TABLE 2

| SIB-ReqInfo-rxx that comprises a digest of hash values of received segments of the SIB12 message SIB-ReqInfo field descriptions |
| --- |
| sib-Type-rxx |
| Contains the SIB type the UE requests while in |
| RRC_CONNECTED. |
| ReceivedSegmentsBitmap-rxx |
| Contains a bitmap indicating which segments have been received. |
| ReceivedSegmentsHashList |
| Contains a list giving the number of the segment and associated hash. |
| sibSegmentNumber-rxx |
| Provides the segment number. This field can be optional, as the contents of the list can be based on ordering of the segments and then actual number of the segment can be extracted from the bitmap. |
| SibSegmentHash-rxx |
| This is the hash associated with a given SIB segment. |
| lastSegmentNumber-rxx |
| Contains the last successfully received SIB segment. |
| sib-HashFct-rxx |
| Contains the hash function used to hash one SIB segment. |
| sibTag-rxx |
| Defines the unique SIB Tag valid for a SIB message. |
| sibHash-rxx |
| Contains the SIBHash at the UE of the last successfully received segment. |

It should be noted that although embodiments have been described with reference to FIG. 7 using the example of cell reselection, the embodiments may be applied also in connection with cell selection, in connection with other changes of a wireless connection and/or in case of any missing segments of a system information block message at the wireless device.

Figure 8:
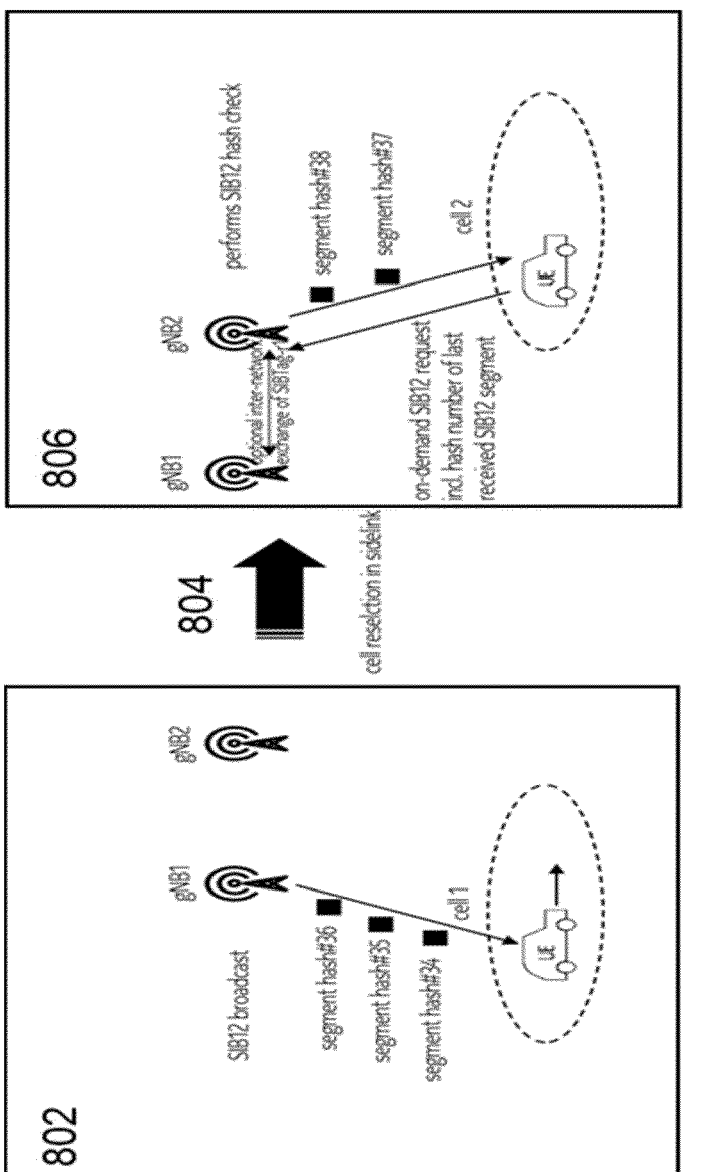
FIG. 8 illustrates an example of communicating segments of at least one system information block message in connection with a cell re-selection in accordance with at least some embodiments of the present invention.

FIG. 8 illustrates an example of communicating segments of at least one system information block message in connection with a cell reselection in accordance with at least some embodiments of the present invention. In phase 802, a UE is connected to a cell, 'cell 1' hosted by a gNB and the UE receives segment numbers #34, #35 and #36 of a SIB12 message from the gNB. The UE calculates hash values based on each of the received segments. In phase 804 the UE performs a cell reselection. In phase 806, the UE has performed the cell reselection and is connected to a new cell, 'cell 2'. The new cell may be hosted by the same gNB or a different gNB. In the example shown in FIG. 8 the last successfully received segment in phase 802 by UE is segment number #36. Since the segment number #36 is not the last segment of the SIB12 message, the complete SIB12 message cannot be assembled based on the segments of the SIB12 message received by the UE from 'cell 1'. The segments may be identified to be a last segment or not based on a SIB12 message information element, segmentType-rxx. The UE transmits to the new cell a system information request that comprises a last successfully received segment number, lastSegmentNumber-rxx, in this example the segment number #36, together with a hash value calculated based on the last successfully received segment, SIBHash-rxx. The system information request may be a modified system information request described with FIG. 7.

In phase 806, the gNB hosting the new cell may perform a validity check on the SIBHash-rxx. The validity check may comprise comparing the received SIBHash-rxx from the UE and a SIBHash determined at the new cell for the segment number #36:

If the SIBHash matches the received SIBHash-rxx from the UE, the received segments of the SIB12 message at the UE may be determined to be valid and they do not need to be changed or discarded. Therefore, the SIB12 message has already been partly received at the UE and the SIB12 message does not need to be changed or discarded. The gNB hosting the new cell may determine non-received SIB message segments, in this example #37 and #38 and to transmit the non-received segments that have not been received by the UE. In this example the gNB hosting the new cell may start to transmit the non-received segments from segment #37 onwards. The non-received segments may be determined to be the segments of SIB12 that have a segment number that is greater than the segment number of the last segment received by the UE.

If the SIBHash does not match the received SIBHash-rxx from the UE, the received segments of the SIB12 message at the UE may be determined to be non-valid and they need to be changed or discarded. Therefore, the SIB12 message that has already been partly received at the UE needs to be changed or discarded. The gNB hosting the new cell may determine to transmit, or broadcast, all segments of the SIB12 message and start the transmission from the first segment, e.g. segment #0.

In an example in accordance with at least some embodiments, 'Cell 1' and 'Cell 2' and/or gNBs hosting the 'Cell 1' and 'Cell 2' exchange system information block tags, SIBTag-rxx. In this way uniqueness of system information block tags of system information block messages may be supported, when assigning system information block tags to system information block messages at gNB.

In an example in accordance with at least some embodiments a change of a wireless connection may be caused by radio link condition deterioration (RLCD). The RLCD may interrupt reception of a SIB12 message by a UE connected to a cell hosted by a gNB of a wireless network, whereby one or more segments of the SIB12 message may be missing at the UE and the UE may not be able to assemble a complete SIB12 message. The UE may detect the RLCD which may trigger the UE to reconnect to the wireless network. The UE may connect the wireless network by performing a Radio Resource Control (RRC) reestablishment. The UE may connect to the same cell that was the serving cell before the RLCD. The serving cell before the RLCD may connected at least after problem that caused the RLCD has been resolved. However, it should be noted that the UE may also connect to a different cell. After the UE has reconnected to the wireless network, similar to described with cell reselection in phase 804 of FIG. 8, also in the case of RLCD, the UE may transmit a segment number of a last successfully received segment, lastSegmentNumber-rxx, from the serving cell before the RLCD together with a hash value determined based on the last successfully received segment, SIBHash-rxx in a system information request to the new cell. It should be noted that, when the wireless device connects to the same serving cell again, there is a high possibility that the information contained in SIB12 message remains the same as before and received segments of the SIB12 message are still valid.

Figure 9:
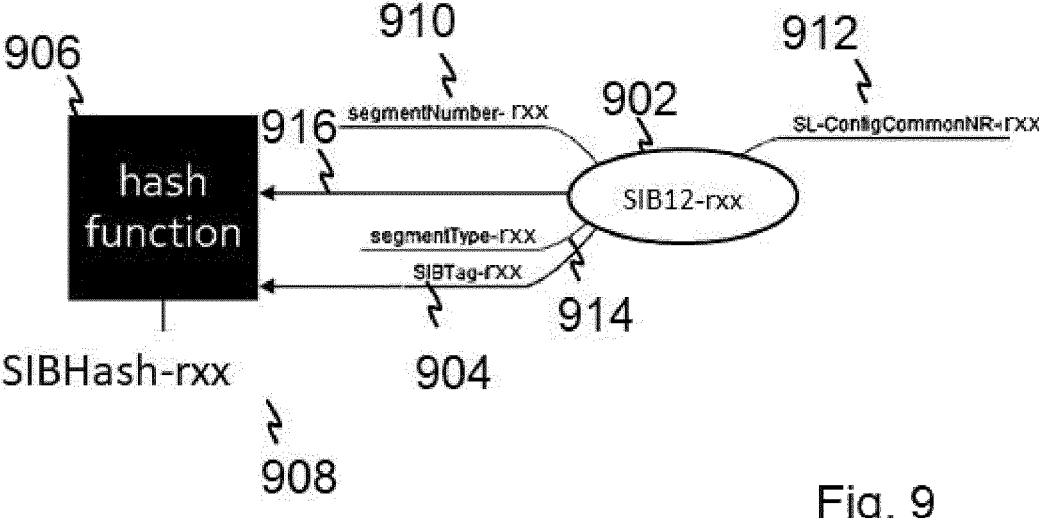
FIG. 9 illustrates an example of determining a hash value based on a system information block message in accordance with at least some embodiments of the present invention.

FIG. 9 illustrates an example of determining a hash value based on a system information block message in accordance with at least some embodiments. The system information block message may be a SIB12 message 902 that is modified to comprise a SIBTag-rxx 904 information element. In this way the SIB12 message may support uniquely identifying segments that belong to the same SIB12 message.

In an example in accordance with at least some embodiments, a predefined hash function 906 may be used by a wireless network and a wireless device for calculating a hash value, SIBHash-rxx 908, based on a segment 916 of the SIB12 message and a SIBTag-rxx. The SIBTag-rxx 904 uniquely identifies the SIB12 message and allows to mark individual segments of the SIB12 message with a the SIBHash-rxx 908. The SIBTag-rxx provides differentiation between SIB12 messages that are not identical, whereby the SIB12 messages may be uniquely identified based on the SIBTag-rxx.

Some examples of the information elements of the IBS12 message comprise segmentType-rxx 914 information element, segmentNumber-rxx 910 information element and a sidelink configuration 912, SL-ConfigCommonNR-rxx, information element. The sidelink configuration defines a sidelink configuration for the wireless device. The segmentType-rxx may identify whether a segment of SIB message is a last segment or not. The segmentNumber-rxx may identify the segment 916 and used as input to the hash function 906 to determine the hash value 908.

Figure 10:
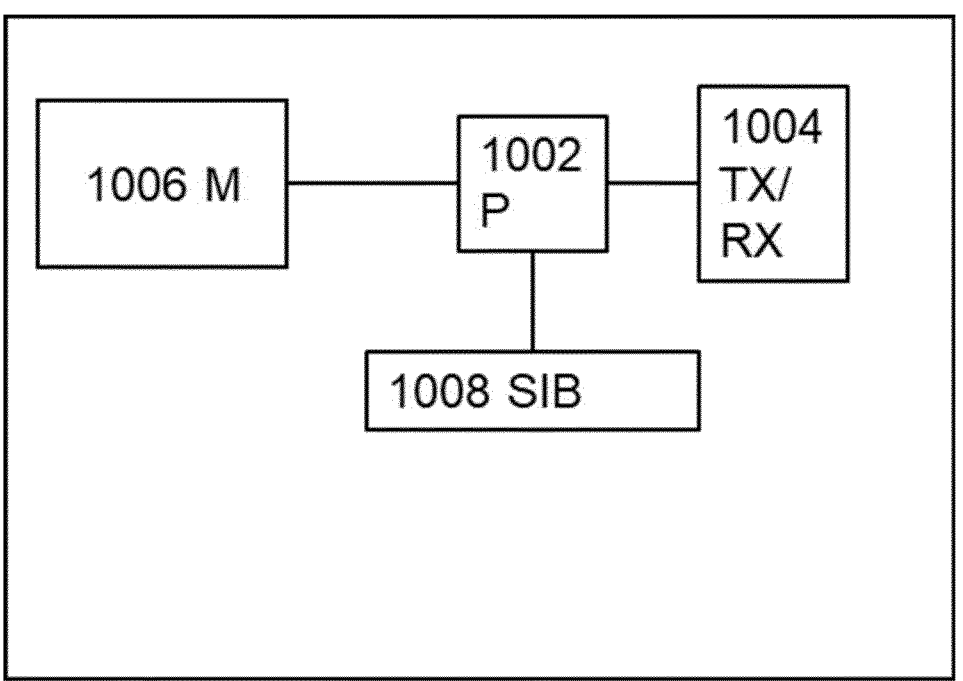
FIG. 10 illustrates examples of a block diagram of an apparatus in accordance with at least some embodiments of the present invention.

FIG. 10 illustrates an example of an apparatus in accordance with at least some embodiments of the present invention. The apparatus may be a gNB, access node, a wireless device or UE, or a part of a gNB, access node, a wireless device or UE.

The apparatus comprises a processor 1002 and a transceiver 1004. The processor is operatively connected to the transceiver for controlling the transceiver. The apparatus may comprise a memory 1006. The memory may be operatively connected to the processor. It should be appreciated that the memory may be a separate memory or included to the processor and/or the transceiver.

In an example, the apparatus comprises a SIB block 1008 connected operatively to the processor. The SIB block may be configured to process segments of SIB messages in accordance with one or more functionalities described in an embodiment described herein. The processing may comprise determining hash values of segments, generating system information requests, assembling system information block messages, determining digests of hash values, determining non-received segments based on hash values and/or determining valid segments based on hash values.

According to an embodiment, the processor is configured to control the transceiver and/or to perform one or more functionalities described with a method according to an embodiment.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, program instructions, instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a wireless network, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

What is claimed is:

1. A method comprising:

receiving, by a wireless device from a wireless network, one or more segments of system information block type 12 (SIB12) message, wherein the SIB12 message comprises a sidelink configuration and a system information block tag;

determining, by the wireless device, at least one hash value based on a last successfully received segment, wherein the at least one hash value is determined using the system information block tag and a segment number of a corresponding segment as inputs to a hash function;

transmitting, by the wireless device to the wireless network, a system information request comprising information indicating the SIB12 system information block type and a lastSegmentNumber identifying the last successfully received segment, and the determined at least one hash value, wherein the wireless device transmits the system information based on:

a change in a wireless connection between the wireless device and the wireless network, wherein the change in the wireless connection comprises a cell reselection or a cell selection; and a determination by the wireless device of at least one missing segment of the SIB12 message;

in response to the transmitted system information request, receiving, by the wireless device, one or more further segments corresponding to the at least one missing segment of the SIB12 message; and assembling, by the wireless device, the SIB12 message by combining the received one or more further segments with the one or more segments that were received prior to transmitting the system information request.

2. The method according to claim 1, wherein the wireless device hashes each of the received one or more segments using the system information block tag and a segment number of a respective one of the received one or more segments.

3. The method according to claim 2, wherein the hash function is selected from a group consisting of MD5, SHA1, SHA256, and SHA512.

4. The method according to claim 3, further comprising:

in response to a determination by the wireless network that the at least one hash value is valid, receiving, by the wireless device, one or more subsequent segments of the at least one system information block message, wherein a first of the one or more subsequent segments has a segment number greater than a last segment received prior to transmitting the system information request; and in response to a determination by the wireless network that the at least one hash value is not valid, receiving, by the wireless device, a first segment of the at least one system information block message having a segment number of zero.

5. The method according to claim 1, wherein the system information request further comprises an information element identifying the hash function used by the wireless device to determine the at least one hash value.

6. The method according to claim 1, wherein the change of the wireless connection is triggered by a radio link condition deterioration (RLCD) and comprises performing a Radio Resource Control (RRC) reestablishment.

7. A method comprising:

determining, by a wireless network, one or more hash values based on one or more segments of at least one system information block 12 (SIB12) message, wherein the at least one SIB12 message comprises a sidelink configuration and a system information block tag that is determined independently for a cell of the wireless network or based on an exchange of system information block tag information between cells of the wireless network, and wherein each of the one or more hash values is determined using the system information block tag and a segment number of each of the one or more segments;

receiving, by the wireless network from a wireless device in connection with a cell re-selection, a system information request comprising information identifying at least one system information block message segment received by the wireless device and at least one hash value determined based on the at least one system information block message segment, wherein the at least one hash value comprises a hash value of a last system information block message segment received by the wireless device or a digest of hash values of a plurality of system information block message segments received by the wireless device;

determining, by the wireless network, at least one non-received segment of the at least one SIB12 message by:

performing a validity check by comparing the at least one hash value in the received system information request with a corresponding hash value from the one or more hash values determined by the wireless network; and based on the validity check indicating a match, identifying the at least one non-received segment as one or more segments of the at least one SIB12 message having segment numbers greater than a segment number of the last system information block message segment identified in the system information request; and transmitting, by the wireless network to the wireless device over a changed wireless connection established after the cell re-selection, the determined at least one non-received segment.

8. An apparatus comprising:

at least one processor; and at least one memory storing instructions that, when executed by the at least one processor, causes the apparatus to perform:

receiving, from a wireless network, one or more segments of at least one system information block 12 (SIB12) message, wherein the SIB12 message comprises a sidelink configuration and a system information block tag;

determining at least one hash value based on a last successfully received segment, wherein each of the at least one hash value is determined using the system information block tag and a segment number of a respective segment as inputs to a hash function;

transmitting, to the wireless network, a system information request comprising information indicating the SIB12 system information block type and a lastSegmentNumber identifying the last successfully received segment, and the determined at least one hash value, wherein the system information request is transmitted based on:

a change of a wireless connection between the wireless device and the wireless network, wherein the change of the wireless connection comprises a cell reselection or a cell selection; and a determination by the wireless device of at least one missing segment of the at least SIB12 message;

in response to the transmitted system information request, receiving, by the wireless device, one or more further segments corresponding to the at least one missing segment of the at least one SIB12 message; and assembling, by the wireless device, the at least one SIB12 message by combining the received one or more further segments with the one or more segments that were received prior to transmitting the system information request without discarding the previously received segments.

9. An apparatus comprising:

at least one processor; and at least one memory storing instructions that, when executed by the at least one processor, causes the apparatus to perform:

determining one or more hash values based on one or more segments of at least one system information block 12 (SIB12) message, wherein the at least one SIB12 message comprises a sidelink configuration and a system information block tag that is determined independently for a cell of the wireless network or based on an exchange of system information block tag information between cells of the wireless network, and wherein each of the one or more hash values is determined using the system information block tag and a segment number of each of the one or more segments;

receiving, from a wireless device, in connection with a cell re-selection, a system information request comprising information identifying at least one system information block message segment received by the wireless device and at least one hash value determined based on the at least one system information block message segment, wherein the at least one hash value comprises a hash value of a last system information block message segment received by the wireless device or a digest of hash values of a plurality of system information block message segments received by the wireless device;

determining at least one non-received segment of the at least one SIB12 message by:

performing a validity check by comparing the at least one hash value in the received system information request with a corresponding hash value from the one or more hash values determined by the wireless network; and based on the validity check indicating a match, identifying the at least one non-received segment as one or more segments of the at least one SIB12 message having segment numbers greater than a segment number of the last system information block message segment identified in the system information request; and transmitting to the wireless device, over a changed wireless connection established after the cell re-selection, the determined at least one non-received segment.

* * * * *